United States Patent Office 3,723,271
Patented Mar. 27, 1973

3,723,271
PRODUCTION OF 4,5-EPOXY-2-PENTENAL FROM CYCLOPENTADIENE USING ACTINIC LIGHT
Karl-Heinrich Schulte-Elte, Chatelaine, Geneva, Switzerland, assignor to Firmenich & Cie, Geneva, Switzerland
No Drawing. Original application July 25, 1969, Ser. No. 845,101, now Patent No. 3,644,430. Divided and this application June 21, 1971, Ser. No. 155,332
Claims priority, application Switzerland, July 29, 1968, 11,323/68
Int. Cl. B01j 1/10
U.S. Cl. 204—162 R        6 Claims

ABSTRACT OF THE DISCLOSURE 4,5-epoxy-2-penten-1-al, which is useful as an intermediate in various organic syntheses, is disclosed together with a process for its preparation which comprises oxidizing cyclopentadiene by means of singlet oxygen.

---

This application is a division of my application Ser. No. 845,101, filed July 25, 1969, now Patent No. 3,644,430.

BACKGROUND OF THE INVENTION

The present invention relates to a cis- and trans-4,5-epoxy-2-pentenal and to methods for preparing same. Due to its three reactive sites (carbonyl, oxirane function, and double bond), this compound can be used as a versatile synthetic intermediate in a variety of chemical preparations. It is therefore useful in several industrial areas of organic chemistry. Some of its applications are described hereinafter.

It is reported that 2-cyclopenten-4-ol-one may be made by dye-sensitized photo-oxigenation of cyclopentadiene according to some general information in a review article [cf. Angew. Chemi 64, 18 (1952)]. It has now been discovered that the compound, 4,5-epoxy-2-pentenal, can be obtained unexpectedly when cyclopentadiene is treated in accordance with the following description.

SUMMARY OF THE INVENTION

The product of the invention, 4,5-epoxy-2-penten-1-al, is prepared by a process which, essentially, comprises oxidizing cyclopentadiene by means of singlet oxygen. Singlet oxygen can be obtained by known methods [cf. Accounts of Chem. Research 1, 104 (1968)).

DESCRIPTION OF THE PREFERRED EMBODIMENTS

A preferred method comprises irradiating triplet oxygen, i.e., molecular oxygen, either pure or in admixture with an inert gas, by means of actinic radiations and in the presence of an energy-transfer sensitizer. Inert gases such as helium, argon, or nitrogen can be used in the above process. Conventional mercury or sodium vapor arcs can be used as sources of actinic radiations for irradiation purposes. Sodium vapor arcs are preferred since, under the action of their radiations, the oxidation reaction proceeds more uniformly and, consequently, higher yields of the desired oxidation product can be obtained.

As energy-transfer sensitizers, most current sensitizers such as porphyrines, methylene blue, cosine, chlorphyll, 3',4',5',6' - tetrachloro - 2,4,5,7 - tetraiodofluorescein (the sodium salt of which is called Rose-Bengale), xanthene, and dinaphhylenethiophene can be used. For economic reasons, Rose-Bengale is preferred.

The oxidation of cyclopentadiene by means of singlet oxygen for producing the product of the invention can take place in the presence of an organic solvent, for instance, an aliphatic or cycloaliphatic hydrocarbon such as hexane, octane, or cyclohexane, or an aromatic hydrocarbon such as benzene, toluene, or xylene, or an alcohol such as methanol, ethanol, propanol, butanol, isopropanol, sec.- butanol, or tert.-butanol, or an ester such as ethyl acetate, butyl acetate and amyl acetate. A mixture of at least two of the above solvents can also be used. For best results, it is preferable that all reagents be easily soluble in the solvent medium used. Methanol, ethanol, or mixtures of these alcohols, with benzene or toluene are preferably used. The temperature at which the oxidation can be carried out can vary between wide limits. For simplicity and economy it is convenient to operate the oxidation between approximately −50 and +50° C. However, at the lower temperatures of this range the formation of the epoxypentenal is slower and at the higher temperatures undesirable side reactions may occur, for instance, a dimerization of cyclopentadiene. Consequently, preferred reaction temperatures are comprised between about 0° and 20° C. or between about 10° and 20° C.

It is advantagous to carry out the oxidation in the presence of a polymerization inhibitor. It is possible, when using such an inhibitor, to prevent nearly completely some unwanted auto-oxidation side reactions that lead to polymers and which may become significant when the oxidation is performed at temperatures above 0° C. Most compounds generally known to inhibit radical induced polymerizations can be used as polymerization inhibitors. For example, hydroquinone, substituted phenols such as di-tert.-butylphenol or aromatic amines such as phenylenediamine can be used. Hydroquinone is preferably used.

The 4,5-epoxy-2-penten-1-al obtained by the oxigenation described above possesses cis-configuration to the extent of about 90–95%.

For most uses, a higher isomeric purity is not required. However, for analytical purposes, the 5–10% of the trans-form can be removed by purification according to usual means. For instance, the pure cis-4,5-epoxy-2-pentenal can be obtained by vapor phase chromatography.

According to the invention, the cis-isomer can be isomerized to trans-4,5-epoxy-2-pentenal by means of a basic isomerizing agent. Inorganic bases, e.g., alkalis or alkaline buffers such as mixtures of sodium carbonate and sodium acetate, as well as organic bases, e.g., tertiary amines and phosphines such as pyridine, quinoline, N-methylpyrrole, triethylamine, tributylphosphine or triphenylphosphine, can be used as isomerizing agents. Tertiary amines such as pyridine having little reactivity toward oxirane functions are preferred isomerizing agents. The isomerization of the cis- to trans-isomer can be carried out after the isolation of said cis-isomer from the oxidation product. Alternatively, the trans-isomer can also be obtained directly by carrying out the oxidation of the cyclopentadiene in the presence of the isomerizing agent defined above. This procedure permits obtaining directly a 4,5-epoxy-2-penten-1-al having a trans-isomer content of about 95%.

4,5-epoxy-2-pentenal can participate in a variety of chemical reactions and represents a very important synthetic intermediate in many fields of organic chemistry. Thus, for instance, the epoxy-pentenal can be catalytically hydrogenated to give diols, said diols being important intermediates in the manufacture of polyesters and polyurethanes.

Moreover, 4,5-epoxy-2-pentenal is a valuable cross-linking agent which can be used for cross-linking various polymeric materials such as polyolefins, polyamides, polyurethanes, polyesters, and the like. A particular advantage of 4,5-epoxy-2-pentenal resides in the fact that, when it is used as a cross-linking agent in polymeric materials used in the manufacture of textile fibers, it introduces into the fiber-forming polymeric material dye-reactive sites which allow the dyeings to be made faster.

Also, the epoxy-pentenal can be condensed with hydrazine derivatives to give pyrazoles, such pyrazoles being of interest to the pharmaceutical industry. The epoxy-pentenal can also be halogenated. The halogenated products can be hydrolyzed and the hydrolysis products can be condensed with phosphoric acid derivatives to give compounds of interest to the insecticide industry.

Furthermore, 4,5-epoxy-2-pentenal is a useful synthetic intermediate in the perfume and flavor industry. For instance, it can be reduced to pentadienal, or odoriferous aldehyde which can be used advantageously in the perfume industry. Epoxy-pentenal can also be used to manufacture ethyl 2,4-decadienoate, an important constituent of pear flavor (see J. Food Science 29, 730 (1964)) as follows: n-hexyltriphenyl-phosphonium bromide (80.4 g.) was stirred with ether (1 liter). To the resulting suspension a 20–25% solution of butyllithium in hexane (65 g.) was added dropwise within 10 minutes. Then a solution of trans-4,5-epoxy-2-pentenal (15.6 g.) in ether (120 ml.) was added dropwise at 10° C. within 15 minutes. The mixture was stirred at 10° for 1 hour, the pH$_3$PO was removed with suction and the extract was washed with water and dried. After the usual treatment, 1,2-epoxy-3,5-undecadiene (22.6 g., 78% trans-cis, 22% trans-trans) was obtained by distillation of the reaction residue, B.P. 62° C./0.05 torr.

Periodic acid (7.5 g.) was stirred for an hour at room temperature under nitrogen with 500 ml. of dry ether. The undissolved periodic acid was removed by filtration and the filtrate was stirred vigorously with a solution of 1,2-epoxy-3,5-undecadiene (5 g. of a 78:22 trans-cis and trans-trans mixture) in ether (50 ml.). The precipitated iodic acid was removed, the filtrate was washed with water, dried, and concentrated under reduced pressure. The residue was distilled and gave a 77:23 mixture of trans-cis and trans-trans-2,4-decadienal (4.4 g.), $d_4^{20}$=0.8999; $n_D^{20}$=1.5142; B.P. −59–61° C./0.05 torr.

The above isomeric mixture of 2,4-decadienal (10 g.), NaCN (16 g.), acetic acid (6 g.), MnO$_2$ (115 g.) and ethanol (1 liter) were stirred at room temperature under nitrogen for 12 hours. The mixture was filtered and diluted with water (1 liter). Then it was extracted with ether (2× 300 ml.) the extracts were washed with water and dried over Na$_2$SO$_4$. After removal of the solvent under reduced pressure the residue was distilled and gave 12 g. of a 75:25 mixture of trans-cis and trans-trans ethyl 2,4-decadienoates (pear esters). B.P. 84–86° C./0.05 torr; $d_4^{20}$=0.9208; $n_D^{20}$=1.4863. The pear esters thus obtained are useful as flavor components for preparing imitation pear flavors by admixing such esters with other known flavor components.

Various processes for producing the products of the invention are further illustrated by the following examples.

Example 1.—Preparation of cis-4,5-epoxy-2-pentenal

Freshly distilled cyclopentadiene (66 g., 1 mole), hydroquinone (5 g.), Rose-Bengale (1 g.) benzene (1.4 lit.) and dry methanol (3 lit.) were placed in a photochemical reaction vessel. The mixture was irradiated with a 200 w. sodium vapor lamp between 15 and 17° C. and a stream of oxygen was introduced into the mixture. 6.5 liters of oxygen were taken up in one hour. Every 4 hours (and on 3 occasions) an additional quantity of cyclopentadiene (66 g.) was added to the mixture. After a total of 90 liters of oxygen had been consumed, the mixture was put aside for 12 hours at room temperature. After the removal of the solvents under reduced pressure, the residue was distilled at 0.01 torr and gave 92% pure cis-4,5-epoxy-2-pentenal (215 g., 55%). The impurities consisted in 4% of the trans-isomer and 4% of non-identified material. The cis-isomer was purified by vapor-phase chromatography (5 m. column, Carbowax 20 M.

He flow 150 ml./min., 120° C.). B.P.=34–36° C./0.01 torr; $n_D^{20}$=1.4750; $d_4^{20}$=1.040. IR spectrum: 2705, 1670, 1612, 1242 cm.$^{-1}$. NMR spectrum: 10.1 (1H, m.); 6.09 (2H, m.), 4.15 (1H, m.); 3.17 (1H, d. of d. J=5.5 and 4 c.p.s.); 2.70 (1H, d. of d. J=5.5 and 2.4 c.p.s.) δ p.p.m. Mass spectrum, mol peak m./e.=98 (5.1); other peaks m./e.=97 (2.8), 96 (1.6), 81 (2.3), 70 (11.7), 69 (24.3), 68 (77), 53 (4), 41 (26.6), 39 (100), 29 (38.2).

Example 2.—Preparation of cis-4,5-epoxy-2-pentenal

A mixture of cyclopentadiene (66 g., 1 mole), hydroquinone (5 g.), Rose-Bengale (1 g.), dry methanol (3 lit.), and benzene (1.4 lit.) was photo-oxidized as described in Example 1, but using a 900 w. mercury-vapor lamp. The oxygen take-up was 22 lit./hr. Additional portions of cyclopentadiene (50 g.) were added every hour up to a total of 5 mole (330 g.). After about 7 hours, 120 lit. of oxygen had been consumed. The mixture was worked up as described in Example 1 and gave 280 g. of product containing 77% of cis-4,5-epoxypentenal, 10% of the trans-isomer and 13% of unidentified impurities as shown by a vapor-phase chromatographic analysis.

Example 3.—Preparation of trans-4,5-epoxy-2-pentenal

A mixture of cyclopentadiene (66 g.), methanol (1 lit.), pyridine (250 ml.), benzene (2 lit.), Rose-Bengale (0.5 g.) and hydroquinone (3 g.) was photo-oxidized as described in Example 2 by means of 25 liters of oxygen under irradiation with a 900 w. mercury-vapor arc. After the usual treatment, distillation of the mixture gave 56 g. (57%) of 92% pure trans-4,5-epoxy-2-pentenal. The 8% impurities consisted of unidentified products. The pure trans-epoxypentenal was obtained by vapor-phase chromatography. B.P. 72°/12 torr; $n_D^{20}$=1.4931; $d_4^{20}$=1.084. IR spectrum: 2720, 1670, 1640, 980, 1240 cm.$^{-1}$. NMR spectrum: 9.46 (1H, m.); 6.42 (2H, m.); 3.54 (1H, m.); 3.07 (1H, d. of d. J=5.5 and 4 c.p.s.); 2.72 (1H, d. of d. J=5.5 and 2.4 c.p.s.) δ p.p.m. Mass spectrum: nearly identical to that of the cis-isomer.

Example 4.—Isomerization of cis-4,5-epoxy-2-pentenal into the corresponding trans-isomer Cis-4,5-epoxy-2-pentenal (50 g.), pyridine (4 g.), and benzene (400 ml.) were stirred 4 hours at room temperature. After removing the solvents in vacuo, the residue was distilled and gave 48.5 g. of pure trans-4,5-epoxy-2-pentenal, B.P. 40°/0.1 torr.

Example 5.—Isomerization of cis-4,5-epoxy-2-pentenal into the corresponding trans-isomer A solution of cis-4,5-epoxy-2-pentenal (10 ml.) and triphenylphosphine (0.1 g.) in benzene (100 ml.) was allowed to stand for 48 hours at room temperature. After the usual treatment, 9.3 g. of trans-4,5-epoxy-2-pentenal were collected by distillation.

The following is claimed:

1. Process for producing 4,5-epoxy-2-pentenal which comprises forming a mixture of cyclopentadiene, hydroquinone and sodium salt of 3′,4′,5′,6′-tetrachloro-2,4,5,7-tetraiodofluorescein in the presence of an organic solvent, introducing oxygen into said mixture while simultaneously exposing the mixture to actinic radiations in order to generate singlet oxygen therein, and oxidizing said cyclopentadiene with said singlet oxygen to 4,5-epoxy-2-pentenal.

2. Process according to claim 1 carried out at a temperature within the range from about 0° to about 20° C.

3. Process according to claim 1 wherein said organic solvent comprises a mixture of methanol and benzene.

4. Process according to claim 1 carried out in the presence of a basic isomerization agent in order to produce said 4,5-epoxy-2-pentenal with at least predominantly a trans-configuration directly in situ, said isomerization agent comprising an inorganic alkali, a tertiary amine or a tertiary phosphine effective to yield said trans-configuration.

5. Process according to claim 4 wherein said isomerization agent comprises a mixture of sodium carbonate and sodium acetate, pyridine, quinoline, N-methylpyrrole, triethylamine, tributylphosphine or triphenylphosphine.

6. Process according to claim 1 which includes the additional separate step of treating said 4,5-epoxy-2-pentenal with an isomerization agent to isomerize it to at least predominantly a trans-configuration, said isomerization agent comprising an inorganic alkali, a tertiary amine or a tertiary phosphine effective to yield said trans-configuration.

References Cited
UNITED STATES PATENTS

| | | |
|---|---|---|
| 3,122,586 | 2/1964 | Berndt et al. _____ 204—162 R X |
| 3,236,897 | 2/1966 | Hornig et al. _____ 204—162 R |
| 3,301,905 | 1/1967 | Reimenschneider. |

BENJAMIN R. PADGETT, Primary Examiner

U.S. Cl. X.R.

204—158 R